United States Patent [19]

Nemoto et al.

[11] 4,017,952

[45] Apr. 19, 1977

[54] METHOD FOR DISASSEMBLING AND REPAIRING A SODIUM-HANDLING APPARATUS

[75] Inventors: Kiyomitsu Nemoto, Mito; Kesahiro Naito, Hitachi; Megumu Urata, Ibaraki; Norihiko Sagawa, Hitachi, all of Japan

[73] Assignee: Hitachi, Ltd., Japan

[22] Filed: Nov. 4, 1974

[21] Appl. No.: 520,905

[30] Foreign Application Priority Data

Nov. 9, 1973 Japan .............................. 48-125283

[52] U.S. Cl. .............................. 29/157.3 R; 176/38; 29/424; 29/426; 29/404; 148/6.3; 134/4; 134/11; 29/401 A; 29/401 C

[51] Int. Cl.² .................... B23P 15/26; B23P 17/00

[58] Field of Search ............... 176/38; 29/157.3 R, 29/424, 426, 404, 401 A, 401 C, 157.3 A, 403; 148/6.3; 134/4, 11

[56] References Cited

UNITED STATES PATENTS

| | | | |
|---|---|---|---|
| 2,487,632 | 11/1949 | Bennett ............................. | 148/6.3 |
| 2,784,123 | 3/1957 | Rappaport ......................... | 148/6.3 |
| 2,795,499 | 6/1957 | Peterson ............................ | 23/186 |
| 2,993,467 | 12/1958 | Gatti ................................. | 148/6.3 |
| 3,004,332 | 10/1961 | Werner .............................. | 75/212 |
| 3,066,391 | 12/1962 | Vordahl ............................. | 75/212 |
| 3,216,824 | 11/1965 | Boghen et al. .................... | 148/6.3 |
| 3,480,425 | 11/1969 | Hardy et al. ...................... | 148/6.3 |

Primary Examiner—Lowell A. Larson
Assistant Examiner—V. K. Rising
Attorney, Agent, or Firm—Craig & Antonelli

[57]   ABSTRACT

A sodium-handling apparatus is disassembled and repaired by (1) contacting an inert gas with the sodium-contacting surfaces within the apparatus after discharge of sodium from the apparatus, thereby solidifying the deposited sodium, (2) flushing the inert gas with a reacting gas capable of reacting with sodium, capable of being dissolved in sodium and capable of forming a weak alkali therein, thereby forming a solid film of a neutral salt on surfaces of the deposited sodium by reaction of sodium with the reacting gas, (3) discharging the reacting gas from the apparatus, (4) disassembling and repairing the apparatus in the atmosphere, and then (5) continuing operation of the apparatus while the solid film is being retained on the surfaces of the apparatus.

15 Claims, 2 Drawing Figures

METHOD FOR DISASSEMBLING AND REPAIRING A SODIUM-HANDLING APPARATUS

BACKGROUND OF THE INVENTION

This invention relates to a method for disassembling and repairing a sodium-handling apparatus, which involves a preparatory step of disassembling and repairing the apparatus directly in the atmosphere while sodium is retained on the surfaces of the apparatus and a step of removing sodium retained on the surfaces of the apparatus after disassembling and repairing, when large-size apparatuses in a cooling system of a fast breeder reacter using sodium as a coolant are repaired.

A heat transfer system of a sodium-cooling fast breeder is comprised of a large scale sodium-handling apparatus such as an intermediate heat exchange, a main circulating pump and a steam generator, in addition to a nuclear reactor. Sodium will be hereinafter referred to "Na", and sodium-handling apparatus as "Na apparatus". These Na apparatus are so designed and fabricated as to have a satisfactory operating capability; but after operation for a definite period of time or when some disorder appears, the Na apparatus it is necessary to remove the Na apparatus from the heat transfer system and subject the Na apparatus to inspection, repairing or other operation. Since Na is a chemically active material, Na deposited on the Na apparatus is washed away in advance when such repairing is carried out. For example, a larger type Na apparatus is cleaned with steam, and a smaller type Na apparatus is cleaned with lower alcohols, and then these apparatus are washed sufficiently with washing water. However, steam cleaning and alcohol cleaning are not always possible, and sometimes the Na apparatus must be hermetically filled with an inert gas while Na is deposited on the Na apparatus. In any cleaning or washing procedure, Na deposited on the Na apparatus is finally converted to caustic soda (NaOH), when Na reacts with water. Even if Na is not washed away, Na reacts with oxygen in the atmosphere according to the following formula:

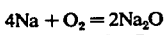

and further, $Na_2O$ reacts with water to form NaOH according to the following formula:

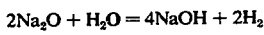

When NaOH is brought in contact with materials of construction of the apparatus, NaOH causes stress corrosion cracking even at a relatively low temperature, for example, 200° C, so long as a load is applied to the materials of construction. Stress corrosion cracking is promoted at higher temperature. In conventional Na washing using water, NaOH is very soluble in water, and consequently NaOH is filled even in very small recesses existing on the surfaces of the materials of construction. It is often experienced that NaOH, once filled in such recesses, is removed therefrom by water washing only with great difficulty. So long as even NaOH filled in the recesses on the surfaces of the materials of construction can directly contact a liquid Na, NaOH will dissolve in Na, and there will be no actual fear of remaining NaOH, but since washing by Na itself cannot be expected at parts in contact with a cover gas, there will be a considerable fear of remaining NaOH. When the Na apparatus is to be restarted after the repairing, it is pre-heated to 150° to 250° C at first, and then to about 500° C during the operation. Therefore, when the Na apparatus is washed with water and there remains even a very small amount of NaOH on the surfaces of the materials of construction, stress corrosion cracking is inevitably brought about.

SUMMARY OF THE INVENTION

An object of the present invention is to provide a method for coating a sodium contacting surface so that Na apparatus can be handled in the air, while Na is retained on the surface of the apparatus, and solve the problems arising when the Na apparatus are disassembled and repaired.

Another object of the present invention is to provide a method for removing substances coated on the Na contacting surfaces simply, safely and surely when the Na apparatus are started again.

According to the present invention, Na apparatus, wherein Na is used in contact with materials of construction constituting the apparatus, are disassembled and repaired while the apparatus are exposed to the atmosphere and Na is retained on the surfaces of the apparatus, by contacting a carbon dioxide gas with the Na contacting surfaces before the Na contacting surfaces are brought into contact with the atmosphere, thereby forming films of sodium carbonate on the Na contacting surfaces, and further by contacting the sodium carbonate layers formed on the Na contacting surfaces directly with molten sodium, thereby washing out the sodium carbonate from the Na contacting surfaces.

Operational difficulty of the conventional steam cleaning or lower alcohol washing can be effectively overcome in the present invention, and subsequent complicated treatments can be also effectively avoided, and stress corrosion cracking due to NaOH can be also eliminated.

DESCRIPTION OF THE PREFERRED EMBODIMENTS

Figure 1:
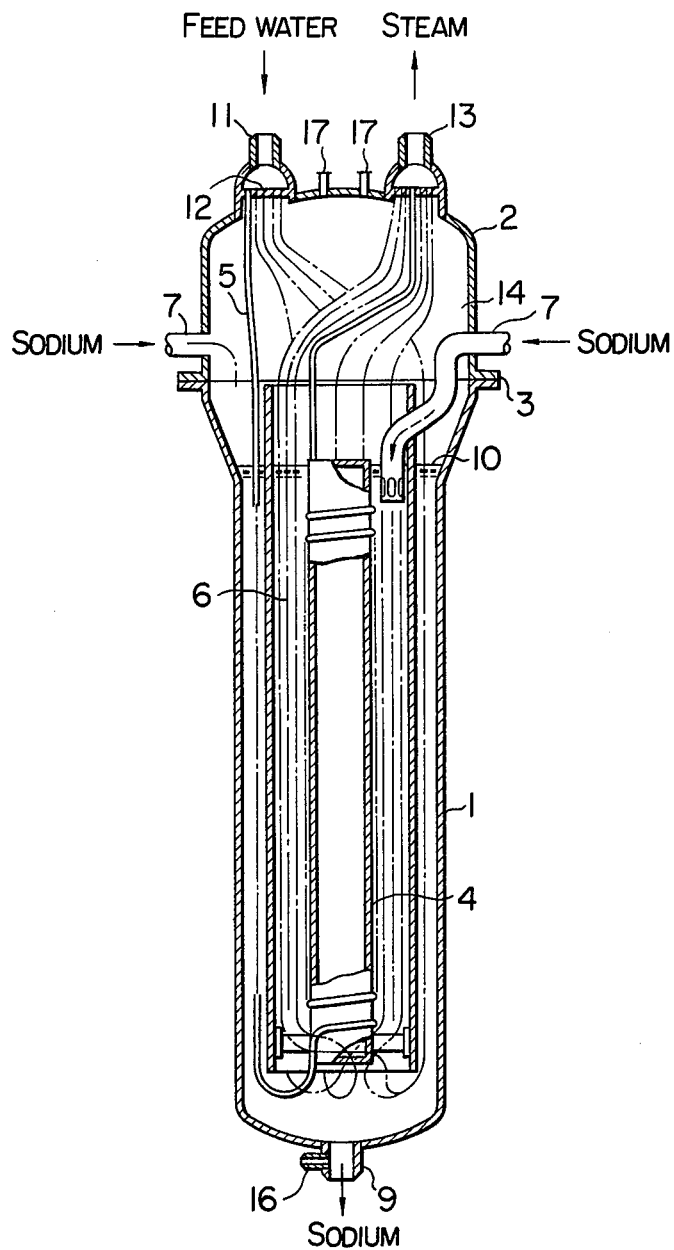
FIG. 1 is a vertical cross-sectional view of a steam generator illustrating one embodiment of the present invention.

Steps of the present invention will be described in detail below:

Step 1: discharging Na from the apparatus

Step 2: filling argon gas in a space in contact with surfaces of the apparatus, the surfaces having been in contact with Na (i.e. the Na-contacting surfaces of the apparatus.

Step 3: cooling metallic Na retained on the Na-contacting surfaces of the apparatus to lower than its solidification temperature (98° C)

Step 4: flushing the argon gas with carbon dioxide

Step 5: forming films of sodium carbonate on surfaces of Na retained on the Na-contacting surfaces by reaction of Na with carbon dioxide Step 6: discharging carbon dioxide Step 7: disassembling and repairing the apparatuses under the atmosphere, and Step 8: continuing a high temperature operation after completion of the repairing, while retaining the film of sodium carbonate on the surfaces of Na.

The present invention comprises these eight steps. Now, problems arising from the reaction, and conditions for solving these problems will be described below, referring to an example of carbon dioxide as a reacting gas. That is to say, in Step 3 Na solidified on the surfaces of materials of construction of the Na apparatus at first reacts with a very small amount of $O_2$ and $H_2O$ contained in the argon gas (Step 4) or the flushing $CO_2$ gas (Step 4) under the argon gas or $CO_2$ gas atmosphere according to the following formulae:

$$2Na + \tfrac{1}{2}O_2 \rightarrow Na_2O \quad (1)$$

$$Na + H_2O \rightarrow NaOH + \tfrac{1}{2}H_2 \quad (2)$$

The formed $Na_2O$ and $NaOH$ further react with $CO_2$ to form a film of $Na_2CO_3$ according to the following formulae:

$$Na_2O + CO_2 \rightarrow Na_2CO_3 \quad (3)$$

$$2NaOH + CO_2 \rightarrow Na_2CO_3 + H_2O \quad (4)$$

In that case, it is desirable that the reaction temperature is as high as possible, but below the solidification temperature of Na, i.e. 98° C.

A very small amount of $H_2$ and $H_2O$ generated according to the reaction formulae (2) and (4) are discharged together with the $CO_2$ gas, and only $Na_2CO_3$ is brought in contact with the atmosphere, that is, air.

When $Na_2CO_3$ is in contact with the air, $Na_2CO_3$ is stable in the air, but if $Na_2CO_3$ is left standing for a longer period of time, it will take in the moisture of the air as water of crystallization to form $Na_2CO_3 \cdot H_2O$.

However, $Na_2CO_3 \cdot H_2O$ will undergo effluorescence to $Na_2CO_3$ during the successive repairing operation, and thereafter Na and the water of crystallization will not react with each other.

After the completion of the repairing operation, the internals of the apparatus are assembled together to form the Na apparatus, while the formed films of $Na_2CO_3$ are retained on the surfaces of Na on the repaired apparatus, and then argon gas is filled in the Na apparatus. Then, Na is charged into the Na apparatuses, in which Na is heated to about 500° C during the stationary operation. $Na_2CO_3$ is decomposed at a temperature of more than 400° C according to the following formula:

$$Na_2CO_3 \rightarrow Na_2O = CO_2 \quad (5)$$

The generated $Na_2O$ can be removed by a cold trap provided in an auxiliary system, together with the remaining $Na_2O$ formed according to the reaction formula (1), if any. The $CO_2$ gas generated according to the reaction (5) is passed into a cover gas system, and thus can be discharged to a vent system together with the argon gas.

NaOH generated according to the reaction formula (2) reacts with $CO_2$ under the $CO_2$ gas-rich condition (Step 4), and there is no possibility that there remains unreacted NaOH. However, even if NaOH remains in the unreacted state in the film by chance, NaOH is well soluble in Na, and thus NaOH dissolved in Na at higher than the saturated solubility at the cold trap temperature is deposited and caught at the cold trap, when Na containing NaOH is transferred to the cold trap. Therefore, the presence of films of $Na_2CO_3$ gives no trouble at all to operation of the apparatuses.

One embodiment of the present invention will be described below, referring to disassembling and repairing of a steam generator as an example.

A structure of steam generator is outlined in FIG. 1. A steam generator is in such a structure that a shell 1 is coupled with a cover 2 by flanges 3, and a bundle 6 of heat transfer pipes comprised of a large number of heat transfer pipes 5 coiled around an inside support 11 is inserted therein. Na is fed from distribution pipes 7, and discharged from an outlet nozzle 9.

Na liquid surface is positioned at a level 10 during the operation. Water is fed from a feed water nozzle 11 into a large number of heat transfer pipes 5 welded to a tube sheet 12, and passed through heat transfer pipes 5 and heated by Na and vaporized. The generated steam is discharged from a vapor outlet nozzle 13. Argon gas 14 is filled in a space over Na liquid level 1o within cover 2. At the top of cover 2, there are nozzles 17 for venting hydrogen gas to the outside of the steam generator when any of heat transfer pipes 5 is damaged by accident, water leaks into Na, and Na-water reaction takes place to generate hydrogen gas. Nozzle 16 and nozzles 17 can be also utilized to form inert films on Na retained on walls of the apparatus.

When the steam generator of such structure is inspected and repaired, water and steam are discharged from heat transfer pipes 5 of the steam generator, and Na within shell 1 is drained from outlet nozzle 9. The, argon gas is filled in shell 1 and cover 2. Then, the entire steam generator is spontaneously cooled to less than the Na solidification temperature (98° C ).

According to the conventional disassembling method, flanges 3 of the steam generator are disengaged from each other, and a bundle of heat transfer pipes 5 is withdrawn from shell 1. As a result, Na retained on the walls of the steam generator is liable to come in contact with the atmosphere, and consequently NaOH is formed.

According to the present invention, an inert film is formed on the surfaces of Na retained on the walls of the apparatus in the following manner before disengaging flanges of the steam generator from each other.

That is to say, the argon gas used as a cover gas is flushed with carbon dioxide gas through nozzles 16 and 17. Carbon dioxide gas will be hereinafter referred to as "$CO_2$ gas". The flushing $CO_2$ gas is allowed to react with Na retained on the wall of the apparatus to form a layer of sodium carbonate on the surfaces of Na. Sodium carbonate will be hereinafter referred to as $Na_2CO_3$.

Then, $CO_2$ gas is fed from nozzle 16 to the steam generator and discharged from nozzle 17 to make the $CO_2$ gas flow through the inside of the steam generator. Reaction between Na and $CO_2$ gas can be promoted thereby and at the same time the $CO_2$ gas can be sufficiently extended to concave parts or slits of the apparatus to provide a complete layer of $Na_2CO_3$.

Figure 2:
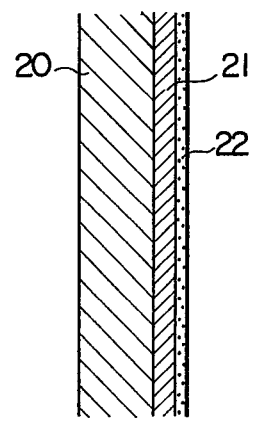
FIG. 2 is a view illustrating a film of $Na_2CO_3$ formed on a Na surface according to the present invention.

In FIG. 2, a state of the layer of $Na_2CO_3$ formed by reaction of $CO_2$ with Na retained on the walls of the apparatus is schematically shown.

In FIG. 2, a $Na_2CO_3$ layer 22 is formed on a Na surface, when Na 21 retained on a wall 20 of apparatus comes in contact with a $CO_2$ gas.

Then, flanges 3 are disengaged from each other, and a bundle of heat transfer pipes 5 is withdrawn, together with cover 2 from shell 1. The inside of the steam generator is exposed to the atmosphere in this manner, inspected and repaired if there is any damaged part.

After the completion of inspection or repairing, the bundle of heat transfer pipes 5 is inserted again into shell 1, flanges 3 are engaged with each other and after the steam generator is assembled into the original form, it is mounted in the plant. After the completion of mounting the steam generator into the plant, the air existing in the steam generator is discharged, and the argon gas is filled therein instead. Thereafter, the entire steam generator is preheated to 150° to 250° C, and then Na is refilled therein.

The steam generator is heated to about 500° C during the stationary operation. Therefore, $Na_2CO_3$ retained on the walls of the apparatus is directly washed with Na, and also $Na_2CO_3$ retained on the walls above the free liquid level 10 of the steam generator can be washed by Na by elevating the liquid level before entering into the stationary operation. The $Na_2CO_3$ can be dissolved in Na relatively stably at a low temperature, but is decomposed to $Na_2O$ and $CO_2$ above about 400° C. $Na_2O$ can be removed by a cold trap provided in an auxiliary system, and the $CO_2$ gas is passed into a cover gas system, and thus can be discharged to a vent system together with the argon gas. Therefore, the presence of $Na_2CO_3$ gives no trouble to the plant operation.

What is claimed is:

1. A method for disassembling and repairing sodium-handling apparatus for use at a high temperature, said sodium-handling apparatus having a sodium-handling space therein for handling sodium, which comprises:
   1. discharging metallic sodium from the sodium-handling space of said apparatus,
   2. filling an inert gas in the sodium-handling space of the apparatus,
   3. cooling metallic sodium retained on the surfaces of the sodium-handling space of the apparatus to lower than the sodium solidification temperature,
   4. flushing the inert gas from said sodium-handling space with a reacting gas capable of reacting with metallic sodium to form a weak alkali soluble in metallic sodium,
   5. forming a solid film of a neutral salt on the surfaces of the metallic sodium by reaction of the reacting gas with metallic sodium,
   6. discharging the reacting gas from the apparatus,
   7. disassembling and repairing the apparatus in the atmosphere, and thereafter
   8. putting the apparatus in a high temperature operation while retaining the solid films of the neutral salt on the surfaces of the metallic sodium.

2. A method according to claim 1, wherein only an argon gas is used as the inert gas.

3. A method according to claim 1, wherein the reacting gas capable of forming a weak alkali soluble in the metallic sodium in step (4) is carbon dioxide gas, and the neutral salt in step (5) is sodium carbonate.

4. A method according to claim 3, wherein only an argon gas is used as the inert gas.

5. A process for disassembling a sodium-handling apparatus including an internal space for handling liquid, metallic sodium, said internal space being defined by sodium-contacting surfaces, said process comprising:
   1. discharging liquid, metallic sodium from said internal space,
   2. filling said internal space with an inert gas,
   3. cooling any liquid, metallic sodium retained on said sodium-contacting surfaces after step (1) below the solidification temperature thereof,
   4. flushing said inert gas from said internal space with a reacting gas capable of reacting with metallic sodium to form a weak alkali salt soluble in liquid, metallic sodium to thereby form a solid film of said weak alkali salt on the surfaces of the solid metallic sodium deposited on said sodium-contacting surfaces, and
   5. disassembling said apparatus.

6. The process of claim 5, further comprising:
   6. reassembling said apparatus while retaining the solid film of weak alkali salt on the surfaces of the metallic sodium deposited on said sodium-contacting surfaces, and
   7. filling said internal space with liquid, metallic sodium.

7. The process of claim 6, wherein the temperature of the liquid metallic sodium filled into said internal space in step (7) is at a temperature high enough to cause the film of weak alkali salt to dissolve therein.

8. The process of claim 7, wherein said reacting gas is carbon dioxide and said weak alkali salt is sodium carbonate.

9. The process of claim 8, wherein said inert gas is argon.

10. The process of claim 6, wherein said reacting gas is carbon dioxide and said weak alkali salt is sodium carbonate.

11. The process of claim 10, wherein said inert gas is argon.

12. The process of claim 5, wherein said reacting gas is carbon dioxide and said weak alkali salt is sodium carbonate.

13. The process of claim 12, wherein said inert gas is argon.

14. In a process for disassembling and reassembling a sodium-handling apparatus having an internal space therein for handling liquid, metallic sodium, said internal space being defined by sodium-contacting surfaces, in which liquid, metallic sodium is removed from said apparatus, an inert gas is filled into said internal space, the apparatus is cooled to a temperature below the solidification temperature of sodium so that liquid, metallic sodium retained on said sodium-contacting surfaces solidifies, the apparatus is disassembled, the apparatus is then reassembled, and then liquid, metallic sodium is recharged into said internal space, the improvement comprising flushing the inert gas from said internal space with a reacting gas capable of reacting with metallic sodium to form a weak alkali salt soluble in liquid, metallic sodium after solidification of liquid, metallic sodium retained on said sodium-contacting surfaces and prior to disassembly of said apparatus so that a solid film of said weak alkali salt is formed on the surfaces of the solid metallic sodium deposited on said sodium-contacting surfaces prior to disassembly of said apparatus.

15. The process of claim 14, wherein said reacting gas is carbon dioxide and said weak alkali salt is sodium carbonate.

* * * * *